Oct. 9, 1934.  J. GEIGER  1,975,840
COMBUSTION POWER LOCOMOTIVE WITH DIRECT AND INDIRECT
TRANSMISSION TO THE DRIVE WHEELS
Filed Dec. 24, 1930

Inventor
Josef Geiger
by Maréchal & Noz
attorneys

Patented Oct. 9, 1934

1,975,840

UNITED STATES PATENT OFFICE 1,975,840

COMBUSTION POWER LOCOMOTIVE WITH DIRECT AND INDIRECT TRANSMISSION TO THE DRIVE WHEELS

Josef Geiger, Augsburg, Germany, assignor to Maschinenfabrik Augsburg-Nurnberg A. G., Augsburg, Germany, a corporation of Germany Application December 24, 1930, Serial No. 504,455
In Germany January 17, 1930

1 Claim. (Cl. 105—62)

This invention relates to locomotives and the like and more particularly to drive means therefor.

One object of the invention is the provision of a drive means for engine driven locomotives and the like in which the power is supplied by a combustion engine substantially of the Diesel type arranged to transmit its power directly to the locomotive driving wheels, and by an independently operating combustion engine also substantially of the Diesel type arranged to transmit its power indirectly, as for instance through a compressed air system, to the driving wheels.

Another object of the invention is the provision of an engine driven locomotive having a directly connected combustion engine and an indirectly connected combustion engine, the latter having provision for super-charging whereby a greater air weight or air loading is supplied to it to increase the output.

Other objects and advantages of the invention will be apparent from the following description, the appended claim and the accompanying drawing, in which—

Figure 1:
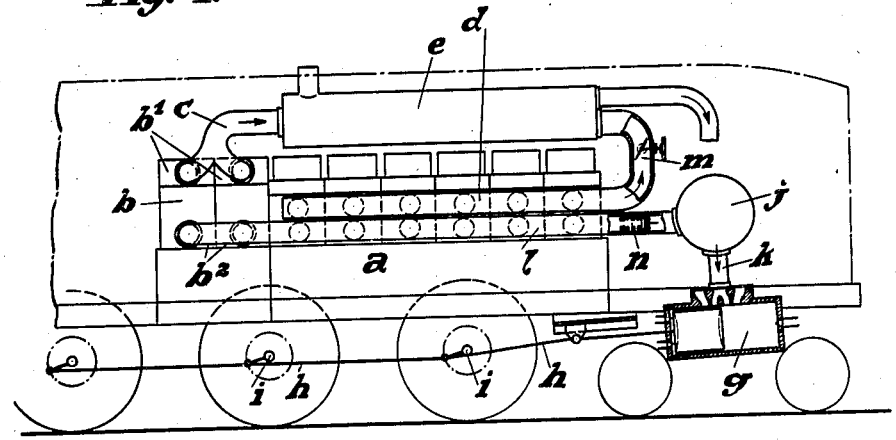
Figure 2:
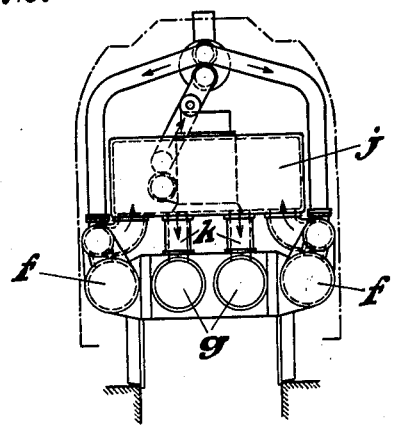

Fig. 1 is a diagrammatic representation of a power locomotive, embodying the present invention; and Fig. 2 is an end view thereof.

Referring more particularly to the drawing by reference letters, a power locomotive is shown, having as its driving means an internal combustion engine arranged to transmit power directly to the locomotive driving wheels, and another independently acting combustion engine which transmits power indirectly, through the medium of a compressed air system, to the driving wheels. The indirectly operating engine $a$, as shown, is directly connected to an air compressor $b$. This air compressor is shown as a multi-cylinder compressor of the reciprocating piston type, but other forms of air compressors could readily be employed. The upper cylinder portions $b^1$ of the compressor are connected to a common pipe $c$ which leads through a heater $e$ heated by the exhaust pipe $d$ of the engine $a$. From the heater $e$ the compressed air is supplied to one or more cylinders $f$ mounted on the side or sides of the locomotive. The cylinders $f$ form the working cylinders of compressed air motors, operably connected to the locomotive driving wheels.

Between the compressed air motors $f$, and preferably mounted in the frame of the locomotive, are combustion power engines $g$, shown in the form of two-cycle double-acting engines operating on the fuel injection principle. The pistons of these engines operate through suitable connections $h$ upon the driving axles $i$ of the locomotive and thus transmit power directly to the driving wheels. The exhaust air of the compressed air motors $f$ is supplied to a receiver $j$ which is preferably supported upon the engines $g$ by means of pipes $k$ and supplies the necessary scavenging and charging air to the directly acting engines $g$.

The lower sides $b^2$ of the cylinders of the air compressor $b$ are connected to a common pipe $l$ for the supply of air to the engine $a$. The pipe $l$ is also connected to the receiver or tank $j$, spring pressed check valve $n$ being arranged between supply passages leading to the engine and the receiver $j$ so that air may be supplied to the pipe $l$ from the receiver $j$ if the pressure in the receiver exceeds the counter pressure of the spring in the valve $n$. In this way the pressure in the receiver $j$ is maintained substantially constant.

The engine $a$ may be either a four-cycle or a two-cycle engine. If the engine operates on the four-cycle principle the supply pipe $l$ is connected to the intake valves of the engine cylinders. These cylinders therefore take in compressed air during the suction stroke, i. e. the engine is supercharged so as to supply a greater air weight to it to increase its output. If the engine $a$ is one of the two-cycle type the supply pipe $l$ is connected to the scavenging air supply passages and a throttle $m$ may be provided in the exhaust pipe $d$ so that it may be capable of adjustment by the operator.

When the throttle $m$ is operated to partly restrict the passage of the exhaust gases from the engine $a$ the pressure level in the engine cylinders is a higher one and at the end of the exhaust period, when the exhaust slots are closed by the piston, the engine cylinders are filled with air of higher pressure, i. e. the cylinders of the engine are supercharged with increased amounts of air and this increases the power supplied through the compressor $b$ and through the air motors $f$ to the driving wheels of the locomotive. The engine $a$ is adapted to supply the greater portion of the power to the driving wheels, the directly connected engine $g$ operating without supercharging so that the normal requirements for the power drive through the connections $g$ and $h$ may be adequately provided for, and unusually high pressures in the directly connected engine cylinders $g$ such as might overload the crank axle connections will not obtain. High pressures of combustion that might obtain in the indirectly connected engine $a$, however, may be adequately provided for as this engine is of comparatively large size and transmits its power indirectly through an air pressure system or the like to the crank axle of the driving wheels. In place of the compressed air drive through an air compressor and motor, obviously other suitable transmissions of a mechanical or electrical type for example, may be used for the indirectly power transmitting engine $a$.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

The method of operating a locomotive provided with a first internal combustion engine directly connected to the driving wheels and a second internal combustion engine having a fluid pressure transmission operably connecting it with the driving wheels, which comprises supplying a minor portion of the power from said first internal combustion engine while maintaining substantially uniform air charge in said first internal combustion engine, supplying a major portion of the power throughout the operation of the locomotive from said second internal combustion engine, and supercharging the second internal combustion engine to vary the power output of the locomotive.

JOSEF GEIGER.